United States Patent

[11] 3,581,171

[72] Inventors Boris Konstantinovich Baranov
Spusk Gertsena, 11, kv. 26;
Boris Alexandrovich Stromin, ulitsa
Sportivnaya 25, kv. 52, both of
Novocherkassk Rostovaskoi Oblasti,
U.S.S.R.
[21] Appl. No. 818,617
[22] Filed Apr. 23, 1969
[45] Patented May 25, 1971

[54] DEVICE FOR CONTROL OF A RECTIFIER MOTOR
4 Claims, 1 Drawing Fig.
[52] U.S. Cl. ................................................ 318/227,
318/231
[51] Int. Cl. ..................................................... H02p 5/40
[50] Field of Search .......................................... 318/138,
171, 227, 230, 231

[56] References Cited
UNITED STATES PATENTS
3,189,810 6/1965 MacGregor .................. 318/227
3,427,526 2/1969 Kernick ........................ 318/227X
3,444,451 5/1969 Schlabach et al. ............ 318/227

Primary Examiner—Oris L. Rader
Assistant Examiner—Gene Z. Rubinson
Attorney—Waters, Roditi, Schwartz & Nissen ABSTRACT: A device for control of a rectifier motor with an implicit DC network including output transformers connected to the control electrodes of the rectifying elements in a frequency (and phase) changer, and motor-voltage and supply-voltage transformers, in which the primaries of the output transformers are connected in series with the secondaries of the supply-voltage transformer, while in series with them are connected diodes which, along with said secondaries, form rectifiers producing as many impulses as there are in the output of the rectifier section of the frequency (and phase) changer, the DC circuits of said rectifiers containing commutation switches whose rectifying-element control circuits are connected to the secondaries of the motor-voltage transformer. The device may be used in a variety of electric-drive types where speed control over a broad range is sought.

PATENTED MAY 25 1971
3,581,171
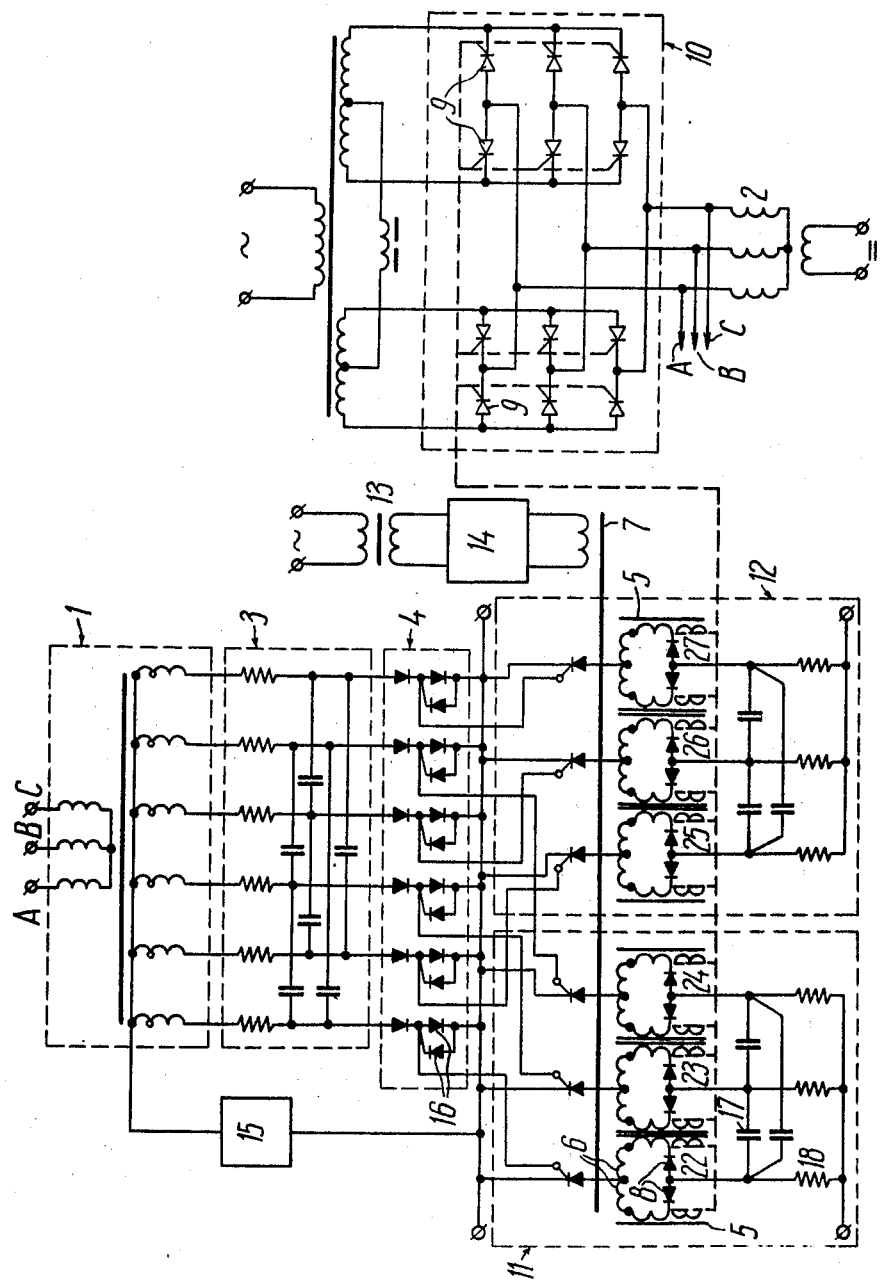

DEVICE FOR CONTROL OF A RECTIFIER MOTOR

The present invention relates to conversion equipment, and more particularly to devices for control of a rectifier motor which is a combination of a synchronous machine and a rectifier-type frequency (and phase) changer.

There exists a device for control of a rectifier motor with an implicit DC network comprising output transformers connected to the control electrodes of the rectifying elements in a frequency (and phase) changer, and also motor-voltage and supply-voltage transformers (see, for example, German Pat. No. 654,603, 1937, Class 21d², 41).

The cited device does not provide for positive control of the rectifying elements in the rectifier and invertor sections of the frequency (and phase) changer having no explicit DC network. Furthermore, this device is not protected against interference in the armature winding of the motor.

An object of the present invention is to eliminate the above-mentioned disadvantages.

A particular object of the invention is to provide a device for control of a rectifier motor, ensuring positive and reliable operation of the motor control system under conditions of varying speed and load.

The present invention provides a device for control of a rectifier motor with an implicit DC network, comprising output transformers connected to control electrodes of rectifying elements in a frequency (and phase) changer, and motor-voltage and supply-voltage transformers. The primary windings of the output transformers are, according to the invention, connected in series with the secondary windings of the supply-voltage transformer, while in series with them are connected diodes which, along with the said secondary windings, form rectifiers producing as many impulses as there are in the output of the rectifier section of the frequency (and phase) changer, the DC circuits of the said rectifiers containing commutation switches whose rectifying-element control circuits are connected to the secondaries of the motor-voltage transformer through another rectifier producing as many impulses as there are in the output of the inverter section of the frequency (and phase) changer.

It is preferable to connect the supply-voltage transformer to a conventionally available AC supply through a sine1wave-to-rectangular voltage converter, and to place a current stabilizer in the circuit of the rectifier connected to the secondaries of the motor-voltage transformer.

It is also preferable to place an RF filter between the motor-voltage transformer and the rectifier connected to it, so as to reduce the interference lever.

Furthermore, the secondaries of the motor-voltage transformer may be sectionalized and arranged into a zigzag connection, in order to provide a means for adjusting the firing angle of the rectifying elements in the inverter section of the frequency changer.

A device constructed in accordance with the present invention accomplishes the objectives sought and may be used in a variety of electric-drive types where speed control over a broad range is sought.

The invention will be best understood from the following description of a preferred embodiment when read in connection with the accompanying drawing which shows the circuit schematic of a device for control of a three-phase rectifier motor, according to the invention.

Referring to the drawing, there is a device comprising essentially the following components: a voltage transformer 1 whose primary (phases A, B and C) is connected to an armature winding 2 of a synchronous machine, while the secondary winding is a six-phase star connected through an RF filter 3 to the input of a six-phase rectifier 4; output transformers 5 whose primaries are connected in series with secondaries 6 of a supply-voltage transformer 7 and with diodes 8, thereby forming single-phase rectifiers, while the secondaries are connected to control electrodes of rectifying elements 9 in the frequency (and phase) changer 10; rectifier-type commutation switches 11 and 12 placed in the DC circuits of the single-phase rectifiers, the control circuits of the rectifier-type commutation switches 11 and 12 being connected through the six-phase rectifier 4 to the secondaries of the voltage transformer 1. The voltage transformer 7 is connected to a transformer 13 through a converter 14 which converts a sine-wave voltage received at the primary of transformer 7 into a rectangular one so as to provide a quality signal in the output transformers 5. The circuit of the six-phase rectifier 4 contains a current stabilizer 15 so as to hold the current within the specified limits and to improve operation of the device.

The device operates as follows.

The rectifier 4 follows variations in the phase of the motor voltage and produces as many impulses as there are in the output of the inverter section in the frequency (and phase) changer 10. Signals about variations in the phase of the motor voltage come from the loads placed in the rectifier arms. In the embodiments being described, these loads are diodes 16 connected to each phase of the rectifier 4 in parallel opposition, so as to make these signals less dependent on the load current. The signals taken from the diodes 16 are applied to the control electrodes of the rectifying elements in the commutation switches 11 and 12. The latter switch current in the circuits containing the secondaries 6 of the voltage transformers 7, the primaries of the output transformers 5, and the diodes 8. In each communication switch 11 and 12, the current is commutated in steps of 120 electrical degrees, in agreement with the angular frequency of the motor voltage, by allowing capacitors 17 to discharge through resistors 18.

In the primaries of the output transformers 5, E.M.F.'s are induced at the instants when current is commutated by the switches 11 and 12, the voltage across the secondary 6 of the voltage transformer 7 is varied, and the current in the diodes 8 is switched. These E.M.F.'s are induced into the secondaries of the output transformers 5 to generate signals to be applied to the control electrodes of the rectifying elements 9 in the frequency (and phase) converter 10, so that the inverted and rectifier sections of the frequency changer 10 operate at the desired firing angles. The secondaries of the voltage transformer 1 are sectionalized (not shown in the drawing) to provide a means for adjustment of the firing angle, and may be connected into a zigzag configuration.

The single-phase rectifiers formed by the series-connected primaries of the output transformers 5 and the diodes 8 produce as many impulses as there are in the output of the rectifier section of the frequency changer 10.

The RF filter 3 placed between the secondary of the voltage transformer 1 and the input of the six-phase rectifier 4 serves to keep down the level of interference due to the presence of peaks and valleys in the waveform of the motor voltage caused by commutation.

We claim:

1. A device for control of a rectifier motor having an armature windings an implicit DC network said rectifier motor including a synchronous machine and a rectifier-type frequency changer being provided with an inverter section having an output and including rectifying elements with respective control electrodes, comprising: a motor-voltage transformer having a primary and a secondary, said primary being connected to said armature winding of said motor; a rectifier having an input, said input being connected to the secondary of said motor-voltage transformer and producing as many impulses as there are in the output of the inverter section in the frequency changer of the rectifier motor; output transformers having primaries and secondaries, a supply voltage transformer having primaries and secondaries, said primaries of said output transformers being connected in series with the secondaries of said supply-voltage transformer while the secondaries of said output transformer are connected to the control electrodes of the rectifying elements in said frequency changer; diodes connected in series with said primaries of the output transformers and the secondaries of the supply-voltage transformer forming single-phase rectifiers producing as many impulses as there are in the output of the rectifier section of said frequency changer; rectifier-type commutation switches placed in the DC circuit of said single-phase rectifiers, said commutation switches including rectifying-element control circuits being connected through said rectifier to the secondary of said motor-voltage transformer.

2. A device, as claimed in claim 1, in which the supply-voltage transformer is connected to a conventional source of AC voltage through a sine-wave-to-rectangular voltage converter.

3. A device, as claimed in claim 2, including a current stabilizer, said current stabilizer being placed in the circuit of the rectifier connected to the secondaries of the motor-voltage transformer.

4. A device, as claimed in claim 3, including an RF filter to reduce the interference level, said RF filter being placed between the motor-voltage transformer and the rectifier connected to it.